US008593944B2

(12) United States Patent
Qian

(10) Patent No.: US 8,593,944 B2
(45) Date of Patent: Nov. 26, 2013

(54) METHOD, APPARATUS AND COMMUNICATION SYSTEM FOR PROTECTING SIGNALING TRANSMISSION

(75) Inventor: Gang Qian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 367 days.

(21) Appl. No.: 12/901,980

(22) Filed: Oct. 11, 2010

(65) Prior Publication Data
US 2011/0032817 A1 Feb. 10, 2011

Related U.S. Application Data

(63) Continuation of application No. PCT/CN2009/071187, filed on Apr. 8, 2009.

(30) Foreign Application Priority Data

Apr. 11, 2008 (CN) .......................... 2008 1 0089653

(51) Int. Cl.
*H04L 12/26* (2006.01)
(52) U.S. Cl.
USPC ....................................................... 370/225
(58) Field of Classification Search
None
See application file for complete search history.

(56) References Cited

U.S. PATENT DOCUMENTS

| 5,831,969 | A | 11/1998 | Bales et al. |
| 6,301,352 | B1 | 10/2001 | Chung et al. |
| 6,937,598 | B1 | 8/2005 | Hagirahim et al. |
| 6,952,395 | B1 * | 10/2005 | Manoharan et al. .......... 370/219 |
| 7,353,293 | B2 | 4/2008 | Hipfinger |
| 8,130,634 | B2 * | 3/2012 | Bakhru .......................... 370/216 |
| 2005/0201749 | A1 * | 9/2005 | Wang et al. ...................... 398/12 |
| 2008/0089227 | A1 * | 4/2008 | Guichard et al. ............. 370/228 |

FOREIGN PATENT DOCUMENTS

| CN | 1171688 A | 1/1998 |
| CN | 101137221 A | 3/2008 |
| CN | 101252461 A | 8/2008 |
| EP | 0 817 527 A2 | 1/1998 |
| EP | 2252005 A1 | 11/2010 |
| JP | 2005-012306 A | 1/2005 |

OTHER PUBLICATIONS

Australian Office Action received in Australian Patent Application No. 2009235862, mailed Apr. 12, 2012, 2 pages.
Written Opinion of the International Searching Authority, International Application No. PCT/CN2009/071187, Applicant: Huawei Technologies Co., Ltd., Dated: Jul. 9, 2009, 5 pages.

(Continued)

*Primary Examiner* — Minh-Trang Nguyen
(74) *Attorney, Agent, or Firm* — Slater & Matsil, L.L.P.

(57) ABSTRACT

The present invention discloses a method, an apparatus, and a communication system for protecting signaling transmission, relates to the communication field, and enables end-to-end signaling protection. In an embodiment of the present invention, a primary signaling path and at least one secondary signaling path are created between terminals; the transmission protocol of the primary signaling path is different from the transmission protocol of the secondary signaling path, and the secondary signaling path works instead when the primary signaling path is in an abnormal state. The embodiments of the present invention are primarily applied to communication systems, and in particular, to the communication systems that support multiple transmission modes, for example, WCDMA system that supports IP bearers.

12 Claims, 7 Drawing Sheets

(56) References Cited

OTHER PUBLICATIONS

Extended European Search Report, European Application No. 09731313.4—1249/2252005, Applicant: Huawei Technologies Co., Ltd., Dated: May 24, 2011, 7 pages.

Applicant Huawei Technologies Co., Ltd., Russian Federation Official Action, Nov. 22, 2011, 6 pages.

Extended European Search Report regarding European Patent Application No. 12174590.5, dated Jul. 31, 2012, 7 pages.

ITU-T, "Series I: Integrated Services Digital Network; Maintenance Principles; ATM protection switching," ITU-T Recommendation I.630, 43 pages, Feb. 1999.

International Search Report, International Application No. PCT/CN2009/071187, Applicant: Huawei Technologies Co., Ltd., et al., Date of completion: Jun. 22, 2009, 8 pages.

Written Opinion of the International Searching Authority, International Application No. PCT/CN2009/071187, Applicant: Huawei Technologies Co., Ltd., et al., Date of mailing: Jul. 9, 2009, 10 pages.

* cited by examiner

METHOD, APPARATUS AND COMMUNICATION SYSTEM FOR PROTECTING SIGNALING TRANSMISSION

This application is a continuation of co-pending International Application No. PCT/CN2009/071187, filed Apr. 8, 2009, which designated the United States and was not published in English, and which claims priority to Chinese Application No. 200810089653.6, filed Apr. 11, 2008, both of which applications are incorporated herein by reference.

TECHNICAL FIELD

The present invention relates to communications technologies and, in particular embodiments, to a method, an apparatus, and a communication system for protecting signaling transmission.

BACKGROUND

Internet Protocol (IP) transmission is the most prevalent transmission technology nowadays, and full-IP communication networks are a megatrend. In radio communication, Asynchronous Transfer Mode (ATM) is still the most widely applied. However, Wideband Code Division Multiple Access (WCDMA), Global System for Mobile communications (GSM), Worldwide Interoperability for Microwave Access (WiMAX), and Long Term Evolution (LTE) systems in the radio communication field begin to support IP transmission in order to meet network development requirements. The old ATM transmission mode is evolving toward IP transmission. For example, a WCDMA R6 system and later versions of WCDMA support an IP bearer as a signaling transmission bearer of an IUB interface.

Regardless of transmission modes, a signaling path is the most essential path of a Base Station System (BSS) in the transmission process. If the signaling path is interrupted, the service of the entire BSS will be interrupted. In order to increase reliability of a base station, if the current signaling path fails, the service needs to hand over to another signaling channel seamlessly without interrupting the upper-layer service.

During evolution from ATM transmission to IP transmission, the ATM transmission coexists with the IP transmission. In the prior art, the solution to protecting signaling transmission is always a redundancy protection solution based on a homogeneous physical link. That is, the signaling path protection solution is specific to only IP transmission, ATM transmission, or another transmission mode, without being compatible with different transmission modes.

For example, the signaling path protection solution is based on an 1.630 ATM Protection Switching technology, Multi-service Packet Switching (MPS) technology specific to STM-1, or Trunking technology specific to Ethernet.

The prior art has the following disadvantages. The protection for signaling transmission is always based on a link layer or physical layer, and links that involve reciprocal switching are based on the same transmission protocol. One situation exists, i.e., different terminals may need to be connected through intermediate network devices. In this situation, the transmission protocols between intermediate network devices and the transmission protocols between an intermediate network device and a terminal are diversified, it may be impossible to perform end-to-end protection switching in the prior art.

SUMMARY OF THE INVENTION

The present invention provide a method, an apparatus, and a communication system for protecting signaling transmission, with a view to performing end-to-end signaling path protection without being restricted by the intermediate transmission network.

According to the first aspect of the present invention a signaling transmission protection method includes creating a primary signaling path between first apparatus and second apparatus. At least one secondary signaling path is created based on a transmission protocol different from a transmission protocol of the primary signaling path between the first apparatus and the second apparatus. Signaling is sent through the primary signaling path and switched over to one of the at least one secondary signaling path to send the signaling if it is detected that the primary signaling path is in the abnormal state.

According to the second aspect of the present invention an apparatus includes a path creating module that is configured to create a primary signaling path between first apparatus and second apparatus and to create at least one secondary signaling path based on a transmission protocol different from the transmission protocol of the primary signaling path between the first apparatus and the second apparatus. A detecting module is configured to detect whether the primary signaling path is in an abnormal state and to trigger a signaling sending module to switch the primary path over to the secondary path if detecting that the primary signaling path is in the abnormal state. A signaling sending module is configured to send signaling through the primary signaling path created by the path creating module and switch over to one of the at least one secondary signaling path to send the signaling after receiving from the detecting module a trigger for switchover from primary path to secondary path.

According to the third aspect of the present invention a communication system includes the apparatus.

In the present invention, a primary signaling path and at least one secondary signaling path are created between two terminals. The transmission protocol of the primary signaling path is different from that of the secondary signaling path. When the primary signaling path is in an abnormal state or fails to communicate normally for certain factors, the primary signaling path is switched over to the secondary signaling path to transmit signaling between terminals. The signaling path switching process is free from restriction by the intermediate network that connects the two terminals. Therefore, the present invention implements end-to-end signaling transmission switching protection with coexistence of different transmission protocols.

DETAILED DESCRIPTION OF ILLUSTRATIVE EMBODIMENTS

In the embodiments of the present invention, a primary signaling path and at least one secondary signaling path are created between terminals so that the signaling path between terminals is protected in the case that multiple transmission protocols are applied to the intermediate network signaling path that connects the terminals. The embodiments of the method, apparatus, and communication system for protecting signaling transmission are elaborated below with reference to the accompanying drawings.

Embodiment 1

Figure 1:
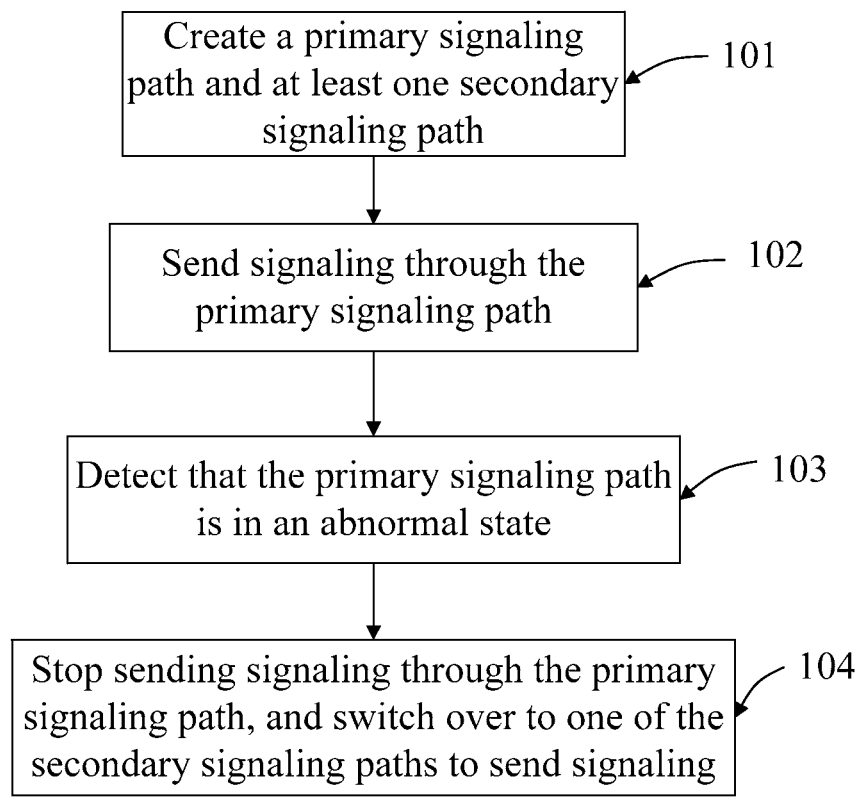
FIG. 1 is a flowchart of a signaling transmission protection method in Embodiment 1 of the present invention.

As shown in FIG. 1, a method for protecting signaling transmission in this embodiment includes the following steps.

101: Create a primary signaling path between two terminals, and create at least one secondary signaling path based on a transmission protocol different from the transmission protocol of the primary signaling path.

102: Send signaling between the two terminals through the primary signaling path.

103: Detect the status of the primary signaling path. If the detected status of the primary signaling path is abnormal, perform step 104.

104: Stop sending signaling through the primary signaling path, and switch over to one of the secondary signaling paths to send signaling.

Figure 2:
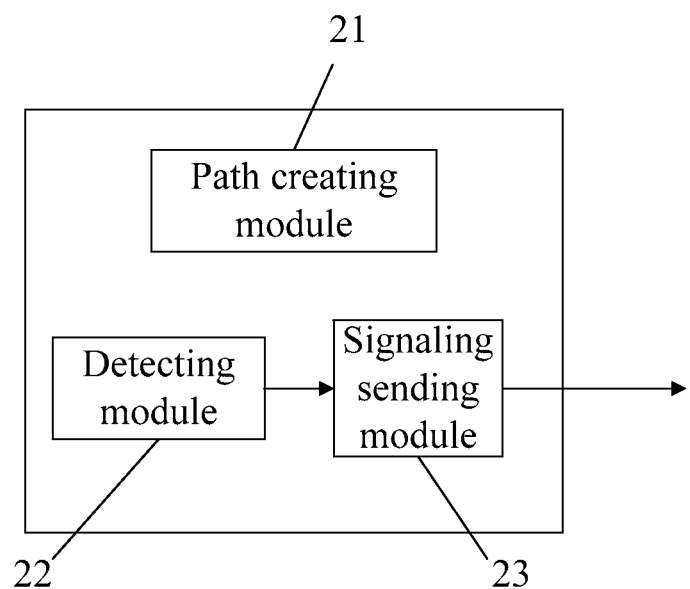
FIG. 2 is a block diagram of a signaling transmission protection apparatus in Embodiment 1 of the present invention.

Corresponding to the foregoing method, a signaling transmission protection apparatus is provided in this embodiment. As shown in FIG. 2, the apparatus includes a path creating module 21 that is configured to create a primary signaling path between two terminals and to create at least one secondary signaling path based on a transmission protocol different from the transmission protocol of the primary signaling path. A signaling sending module 22 is configured to send signaling between the two terminals reciprocally through the primary signaling path. A detecting module 23 is configured to detect the status of the primary signaling path and to notify the signaling sending module if the detected status of the primary signaling path is abnormal.

The signaling sending module 22 is further configured to stop sending signaling through the primary signaling path according to the notification from the detecting module, and switch over to one of the secondary signaling paths to send signaling.

With the foregoing method and the apparatus being applied between terminals, the signaling transmission is protected between the terminals.

When the foregoing method and apparatus for protecting signaling transmission are applied in a network, an apparatus needs to be installed in a terminal that employs the foregoing method. If the foregoing apparatus is installed in two terminals that need to communicate with each other in a network, a signaling transmission system is constituted.

Because a primary signaling path and at least one secondary signaling path are created between two terminals in the foregoing embodiment, once the primary signaling path fails, the secondary signaling path works instead to ensure correct delivery of signaling between the two terminals and ensure communication quality.

Embodiment 2

Figure 3:
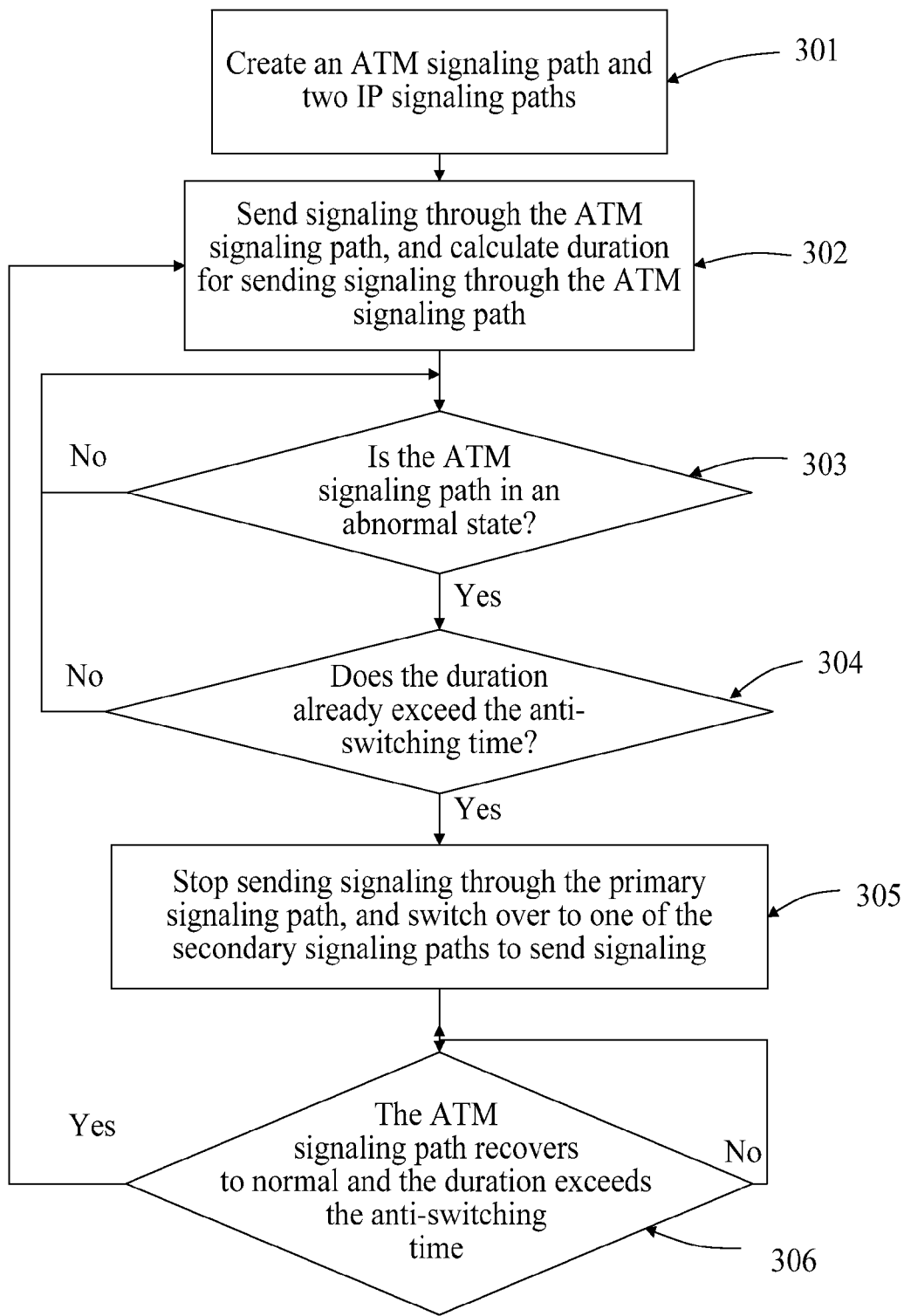
FIG. 3 is a flowchart of a signaling transmission protection method in Embodiment 2 of the present invention.

As shown in FIG. 3, a method for protecting signaling transmission in this embodiment includes the following steps.

301: Create a primary signaling path and at least one secondary signaling path between terminals. Because the signaling path of the intermediate network may employ different transmission protocols, the primary signaling path is generally an ATM signaling path and the secondary signaling path is generally an IP signaling path. It is understandable that when Quality of Service (QoS) of an IP signaling path is relatively high, the IP signaling path may serve as a primary signaling path. The ATM signaling path may serve as a secondary signaling path or an IP signaling path of relatively low QoS serves as a secondary signaling path. In this embodiment, it is assumed that the primary signaling path is an ATM signaling path, and the secondary signaling path is an IP signaling path. In this embodiment, it is assumed that an ATM signaling path is created between the terminals as a primary signaling path, and two IP signaling paths are created as secondary signaling paths.

302: Set anti-switching time which is generally not less than the maximum sensitivity of link detection. Send signaling between terminals through the ATM signaling path, and calculate the duration for sending the signaling through the ATM signaling path. Meanwhile, receive, by each terminal, signaling from one ATM signaling path and two IP signaling paths. The mode of receiving signaling from every signaling path ensures that the terminal can receive signaling completely no matter which signaling path is active for transmitting the signaling.

303: Monitor status of the ATM signaling path in real time, and analyze whether the ATM signaling path is in an abnormal state according to alarms on the physical layer, Bidirectional Forwarding Detection (BFD) protocol, Operation Administration Operation (OAM) protocol, link-layer status detection, link deletion, or any combination thereof. Perform step 304 if the ATM signaling path is in an abnormal state. Repeat step 303 if the ATM signaling path is in a normal state.

304: Judge whether the duration calculated in step 302 exceeds the set anti-switching time. Perform step 305 if the duration calculated in step 302 exceeds the set anti-switching time. Perform step 303 if the duration calculated in step 302 does not exceed the set anti-switching time. The anti-switching time in this step is generally not less than the maximum sensitivity of link detection.

305: Stop sending signaling through the ATM signaling path, and switch over to one of the IP signaling paths to send the signaling, and then recalculate the duration for sending the signaling through the one of the IP signaling paths. Meanwhile, receive, by each terminal, signaling from one ATM signaling path and two IP signaling paths.

In this step, the detailed process of switching over to one of the IP signaling paths to send the signaling may include monitoring QoS of all IP signaling paths in real time; if the QoS of an IP signaling path is relatively high, switching over to this IP signaling path to send the signaling.

306: Monitor the status of the ATM signaling path in real time. If the ATM signaling path recovers to normal and the duration for sending signaling through one of the IP signaling paths exceeds the set anti-switching time which is not less than the maximum sensitivity of link detection, perform step 302. If the ATM signaling path does not recover to normal and the duration for sending signaling does not exceed the set anti-switching time, repeat step 306.

In the foregoing method, one ATM signaling path and two IP signaling paths are created, and signaling is received from every signaling path. The received signaling is sent to the upper-layer protocol module for processing. However, signaling is sent on only one ATM signaling path. When the status of the ATM signaling path is abnormal, signaling is sent through one of the IP signaling paths, but signaling is still received from every signaling path.

With the signaling being received from multiple signaling paths, it is ensured that the signaling sent from the peer side is received completely. Even if switchover occurs on the peer side but does not occur on the local side, the entirety of the signaling can be received. If the signaling is sent through only one signaling path, the primary link and the secondary link can be selected flexibly. The data can be sent only on the currently primary signaling path. Generally, the signaling path of highest QoS is selected as the primary signaling path. The remaining signaling paths serve as secondary signaling paths. In this embodiment, the ATM signaling path has the highest QoS, and serves as the primary signaling path.

In the foregoing method, switchover occurs after an abnormal status of the ATM signaling path is detected. The signaling path may be switched over according to another detection basis. A signaling is received through the IP signaling path, and the signaling indicates that the peer has switched over to the IP signaling path to transmit signaling, and therefore, the local side also needs to switch over to the corresponding IP signaling path to transmit signaling. This method of switching over after receiving signaling from the IP signaling path is basically the same as the steps in FIG. 3 above except for the required anti-switching time. The anti-switching time in this method is required to be not less than the transmission delay of the signaling.

It is understandable that the anti-switching time for switchover from the primary signaling path to the secondary signaling path and the anti-switching time for switchover from the secondary signaling path to the primary signaling path may be set to be the same value or different values according to actual conditions.

Figure 4:
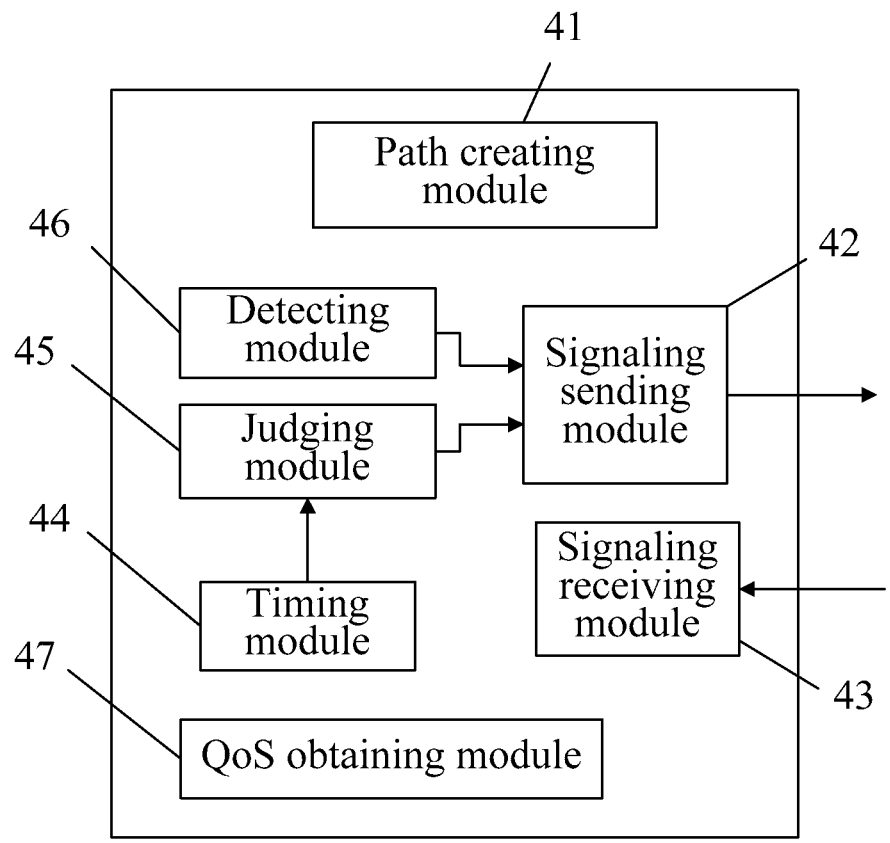
FIG. 4 is a block diagram of a signaling transmission protection apparatus in Embodiment 2 of the present invention.

A signaling transmission protection apparatus is provided in an embodiment of the present invention. As shown in FIG. 4, the apparatus includes a path creating module 41, a signaling sending module 42, a signaling receiving module 43, a timing module 44, a judging module 45, and a detecting module 46.

The path creating module 41 is configured to create a primary signaling path and at least one secondary signaling path between terminals.

Generally, the primary signaling path is an ATM signaling path, the secondary signaling paths are IP signaling paths. If the QoS of an IP signaling path is relatively high, this IP signaling path may also serve as a primary signaling path. The ATM signaling path serves as a secondary signaling path, or the IP signaling path of lower QoS serves as a secondary signaling path. In this embodiment, an ATM signaling path is created between the terminals as a primary signaling path, and two IP signaling paths are created as secondary signaling paths.

The signaling sending module 42 is configured to send signaling through the ATM signaling path when the ATM signaling path is normal, and send signaling through one of the IP signaling paths when the ATM signaling path is abnormal. In this embodiment, the ATM signaling path is normal, and the signaling needs to be sent through the ATM signaling path.

The signaling receiving module 43 is configured to receive signaling from one ATM signaling path and two IP signaling paths.

The timing module 44 is configured to set anti-switching time. When the ATM signaling path is normal, the timing module 44 is configured to calculate the duration for sending signaling through the ATM signaling path, or, when the ATM signaling path is abnormal, to calculate the duration for sending the signaling through one of the IP signaling paths. In order to ensure the transmission quality of the signaling, the anti-switching time is generally set to be not less than the maximum sensitivity of link detection. Because the signaling sending module sends signaling through the ATM signaling path, the timing module calculates the duration for sending the signaling through the ATM signaling path.

The judging module 45 is configured to judge whether the signaling sending duration calculated by the timing module 44 already exceeds the anti-switching time.

The detecting module 46 is configured to detect whether the ATM signaling path is in an abnormal state.

The signaling sending module 42 is further configured to: stop sending signaling through the ATM signaling path if the detecting module 46 detects that the primary signaling path (namely, ATM signaling path in this embodiment) is in an abnormal state and the judging module 45 determines that the duration for sending signaling through the ATM signaling path exceeds the anti-switching time, and switches over to one of the IP signaling paths (namely, secondary paths) to send signaling; and, after completion of the switchover, notify the timing module 44 to recalculate time, namely, recalculate the duration for sending signaling through the IP signaling path. It is understandable that the timing module 44 can also recalculate time automatically after timeout.

Generally, one of the secondary IP signaling paths works instead to send signaling, as detailed below. A QoS obtaining module 47 obtains the QoS of all secondary signaling paths, namely, QoS for protecting the IP signaling path; and therefore, the signaling sending module 42 may switch over to the secondary signaling path of higher QoS to send signaling according to the QoS of all secondary signaling paths obtained by the QoS obtaining module 47.

The detecting module 46 detects whether the primary signaling path is in an abnormal state according to an alarm on the physical layer, BFD protocol, OAM protocol, link-layer status detection, link deletion, or any combination thereof.

After the detecting module 46 detects that the ATM signaling path has recovered and the duration for sending signaling through one of the IP signaling paths exceeds the set anti-switching time, the signaling sending module 42 stops sending signaling through the IP signaling path, but through the ATM signaling path.

The detecting module 46 detects whether the primary signaling path is in an abnormal state also according to a signaling received from the IP signaling path, and this signaling indicates that the peer side has switched over to the IP signaling path to transmit signaling and the local side also needs to switch over to the corresponding IP signaling path to transmit signaling. Corresponding to the method of performing switchover according to a signaling received from the IP signaling path, a signaling transmission protection apparatus is provided in an embodiment of the present invention. The structure of this apparatus is almost the same as the structure of the apparatus shown in FIG. 4 except the anti-switching time set by the timing module. The anti-switching time set by the timing module in this apparatus is required to be not less than the transmission delay of the signaling.

Figure 5:
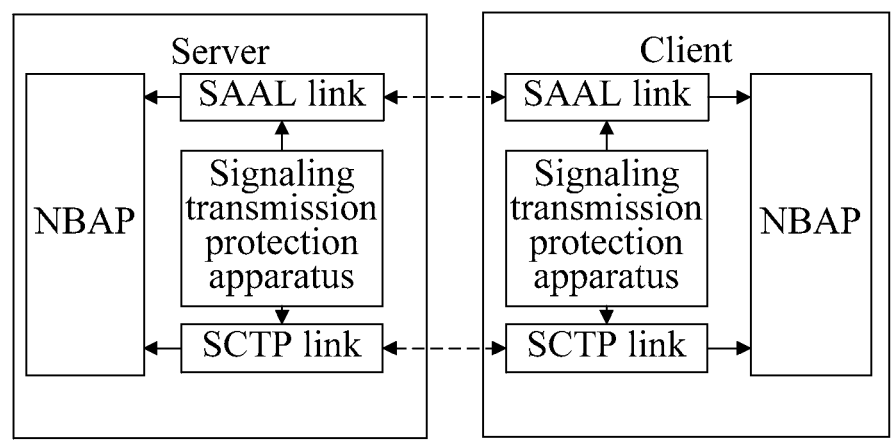
FIG. 5 is a block diagram of a signaling transmission system applied in a WCDMA system in Embodiment 2 of the present invention.

As shown in FIG. 5, in a WCDMA system, the signaling path may be carried over a Signaling ATM Adaptation Layer (SAAL) link in an ATM transmission mode, and may be carried over a Stream Control Transmission Protocol (SCTP) link in an IP transmission mode. Multiple signaling paths may work simultaneously including multiple receiving paths and a single transmitting path. That is, the data received by the SAAL link and the SCTP link are sent to Node B Application Part (NBAP), but there is only one transmitting link.

Embodiment 3

Figure 6:
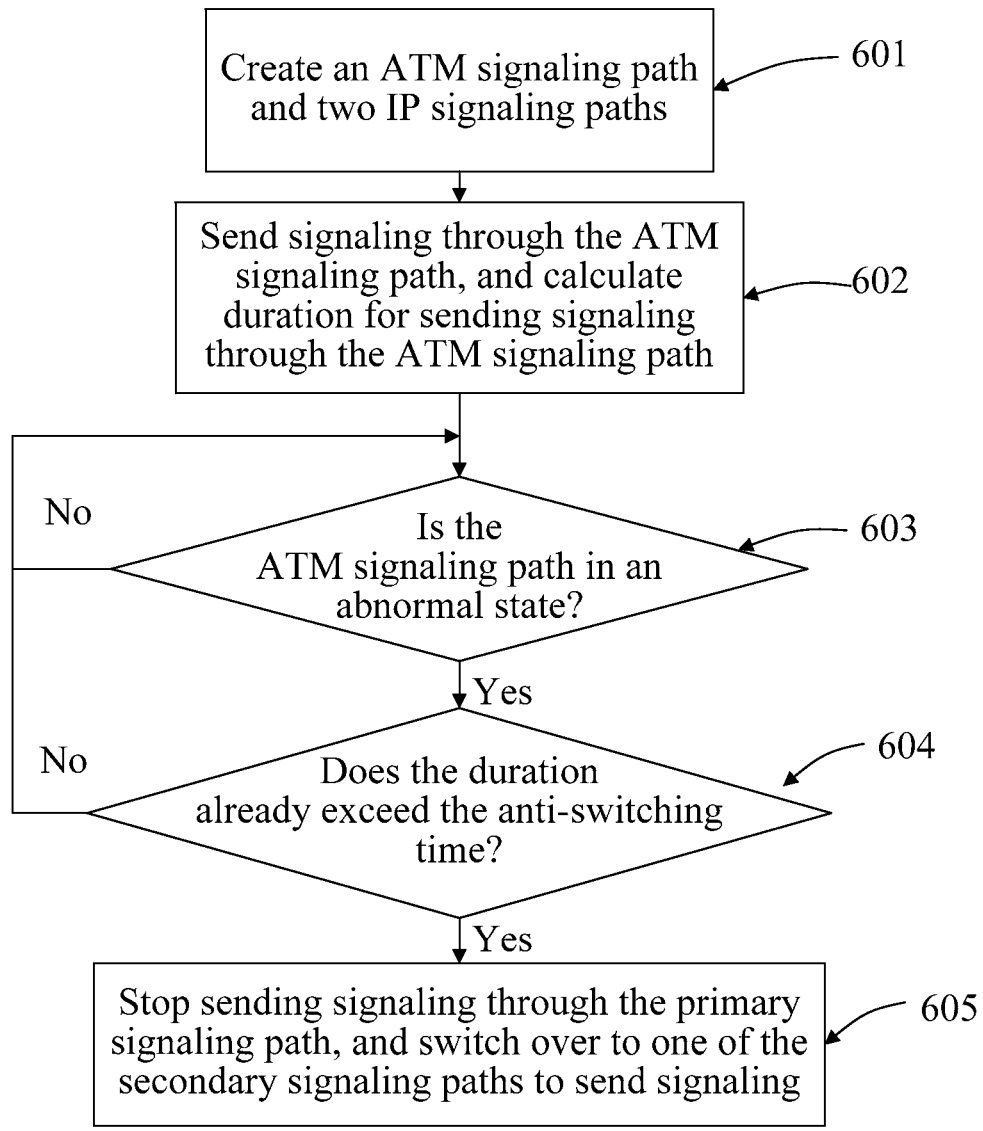
FIG. 6 is a flowchart of a method for protecting client-side signaling transmission in Embodiment 3 of the present invention.

In this embodiment, two apparatus are involved in the communication. For example, one apparatus is a server and the other apparatus is a client, and therefore, the signaling transmission protection method employed by the server may be a little different from that employed by the client. The signaling transmission protection method employed by the server may include the same steps as those shown in FIG. 3, and the signaling transmission protection method employed by the client includes steps as follows. Reference can be made to FIG. 6 for these steps.

601: Create an ATM signaling path between the client and the server as a primary signaling path, and create two IP signaling paths as secondary signaling paths.

602: Send signaling to the server through the ATM signaling path, and calculate the duration for sending signaling through the ATM signaling path; and receive signaling from the ATM signaling path and two IP signaling paths. Optionally, set anti-switching time.

603: Monitor the status of the ATM signaling path in real time, and analyze whether the ATM signaling path is in an abnormal state according to a signaling received from the IP signaling path. Perform step 604 if the ATM signaling path is in an abnormal state. Repeat step 603 if the ATM signaling path is in a normal state.

604: Judge whether the duration calculated in step 602 exceeds the set anti-switching time. Perform step 605 if the duration calculated in step 603 exceeds the set anti-switching time. Perform step 603 if the duration calculated in step 603 does not exceed the set anti-switching time. The anti-switching time in this step is generally not less than the transmission delay of the signaling.

605: Stop sending signaling through the ATM signaling path, and switch over to the IP signaling path that receives the signaling to send signaling, and calculate the duration for sending signaling through the IP signaling path. Meanwhile, receive signaling from one ATM signaling path and two IP signaling paths.

Figure 7:
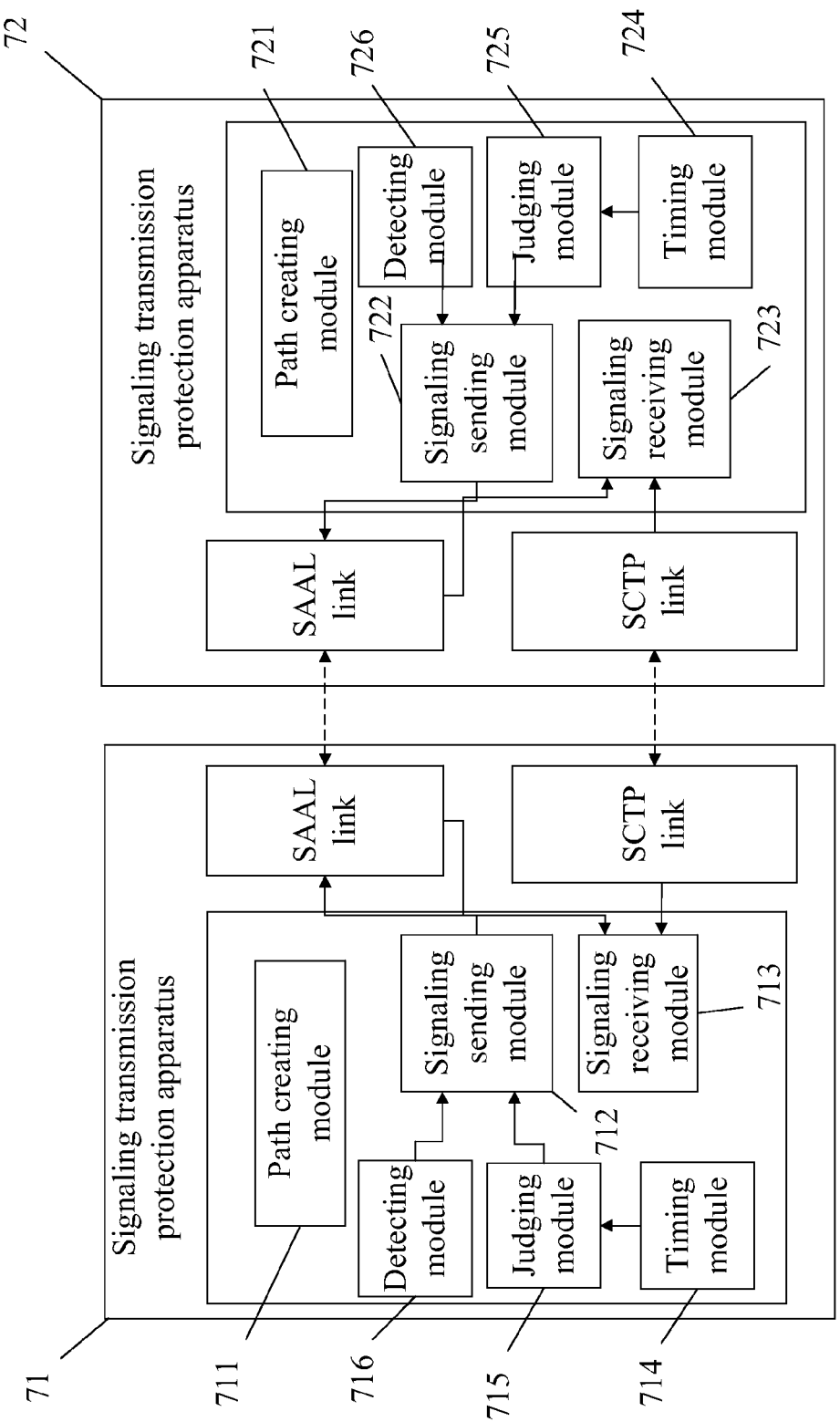
FIG. 7 is a block diagram of a signaling transmission protection system in Embodiment 3 of the present invention.

The embodiments of the present invention also provide a communication system capable of protecting signaling transmission. As shown in FIG. 7, the signaling transmission system includes a server 71 and a client 72. The server includes a path creating module 711 that is configured to create a primary signaling path and at least one secondary signaling path between the server and the client. The transmission protocol employed by the primary signaling path is different from the transmission protocol employed by the secondary signaling path. For example, the primary signaling path is an ATM signaling path and the secondary signaling path is an IP signaling path. It is assumed in this embodiment that the primary signaling path is an ATM signaling path, and the secondary signaling paths are two IP signaling paths.

A signaling sending module 712 is configured to send signaling through the ATM signaling path when the ATM signaling path is normal and to send signaling through the IP signaling path when the ATM signaling path is abnormal. A signaling receiving module 713 is configured to receive signaling from the client through one ATM signaling path and two IP signaling paths.

A timing module 714 is configured to set anti-switching time, to calculate the duration for sending the signaling through the ATM signaling path when the ATM signaling path is normal, and to calculate the duration for sending the signaling through the IP signaling path when the ATM signaling path is abnormal. In order to ensure the transmission quality of the signaling, the anti-switching time is generally not less than the maximum sensitivity of link detection. If the signaling sending module sends signaling through the ATM signaling path, the timing module calculates the duration for sending signaling through the ATM signaling path.

A judging module 715 is configured to judge whether the signaling sending time exceeds the anti-switching time and a detecting module 716 is configured to detect whether the ATM signaling path is in an abnormal state.

The signaling sending module 712 is further configured to stop sending signaling through the ATM signaling path if the detecting module 716 detects that the primary signaling path is in an abnormal state and the judging module 715 determines that the duration for sending signaling through the ATM signaling path exceeds the anti-switching time. The signaling sending module 712 is also configured to switch over to one of the secondary IP signaling paths to send signaling; and, after completion of the switchover, to notify the timing module 714 to recalculate time, namely, recalculate the duration for sending signaling through the IP signaling path. It is understood that the timing module 714 can also recalculate time automatically after timeout.

The detecting module 716 in the server detects whether the primary signaling path is in an abnormal state according to an alarm on the physical layer, BFD protocol, OAM protocol, link-layer status detection, link deletion, or any combination thereof.

Further, the signaling sending module 712 is further configured to stop using the IP signaling path to send signaling but switch over to the ATM signaling path to send signaling if the detecting module 716 in the server detects that the ATM signaling path recovers and judging module 715 determines that the duration for sending signaling after switching over to one of the IP signaling paths exceeds the set anti-switching time.

The client 72 in the signaling transmission system includes a path creating module 721 that is configured to create a primary signaling path and at least one secondary signaling path between the server and the client. The transmission protocol employed by the primary signaling path is different from the transmission protocol employed by the secondary signaling path. For example, the primary signaling path is an ATM signaling path and the secondary signaling paths are two IP signaling paths.

A signaling sending module 722 is configured to send signaling through the ATM signaling path when the ATM signaling path is normal, and to send signaling through the IP signaling path when the ATM signaling path is abnormal. A signaling receiving module 723 is configured to receive signaling from one ATM signaling path and two IP signaling paths.

A timing module 724 is configured to set anti-switching time, to calculate the duration for sending the signaling through the ATM signaling path when the ATM signaling path is normal, or to calculate the duration for sending the signaling through the IP signaling path when the ATM signaling path is abnormal. In order to ensure the transmission quality of the signaling, the anti-switching time is generally not less than the transmission delay of the signaling. If the signaling sending module sends signaling through the ATM signaling path, the timing module calculates the duration for sending signaling through the ATM signaling path.

A judging module 725 is configured to judge whether the duration for send signaling through the ATM signaling path exceeds the anti-switching time which is generally not less than the transmission delay of the signaling. A detecting module 726 is configured to detect whether the ATM signaling path is in an abnormal state.

The signaling sending module 722 is further configured to stop sending signaling through the ATM signaling path if the detecting module 726 detects that the primary signaling path is in an abnormal state and the judging module 725 determines that the duration for sending signaling through the ATM signaling path exceeds the anti-switching time, and switch over to one of the IP signaling paths to send signaling. The signaling sending module 722 is also configured to notify the timing module 724 to recalculate time, namely, recalculate the duration for sending signaling through the IP signaling path. It is understood that the timing module 724 may recalculate time automatically after timeout. Meanwhile, the signaling receiving module 723 is configured to receive signaling from all signaling paths, including one ATM signaling path and two IP signaling paths. The abnormal state of the primary signaling path is detected according to a signaling received from one of the secondary signaling paths.

Figure 8:
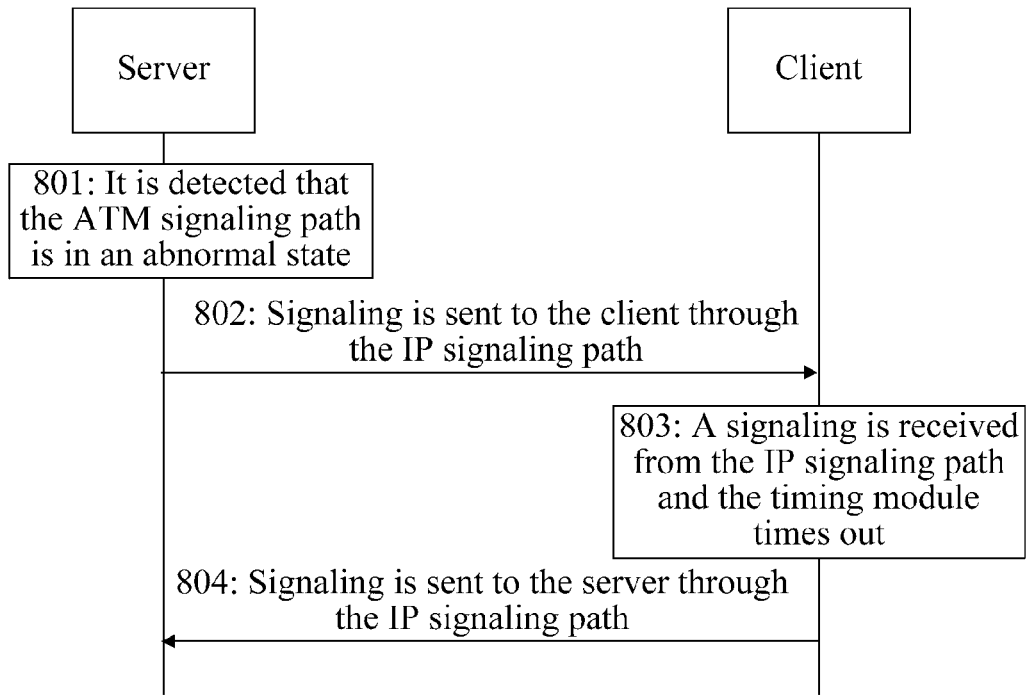
FIG. 8 is a flowchart of a first signaling path switching method in signaling transmission in Embodiment 3 of the present invention.

There are three possible processes of the method for protecting the signaling path switchover between the client and the server. As shown in FIG. 8, the first possible process of signaling path switching protection between the client and the server includes the following steps.

801: The server detects that the ATM signaling path is in an abnormal state, and obtains the QoS of every IP signaling path.

802: The server sends signaling to the client through the IP signaling path of higher QoS.

803: The client receives the signaling from the server on the foregoing IP signaling path, and the duration calculated by the timing module of the client already exceeds the anti-switching time.

804: The client switches over to the foregoing IP signaling path to send signaling to the server.

Figure 9:
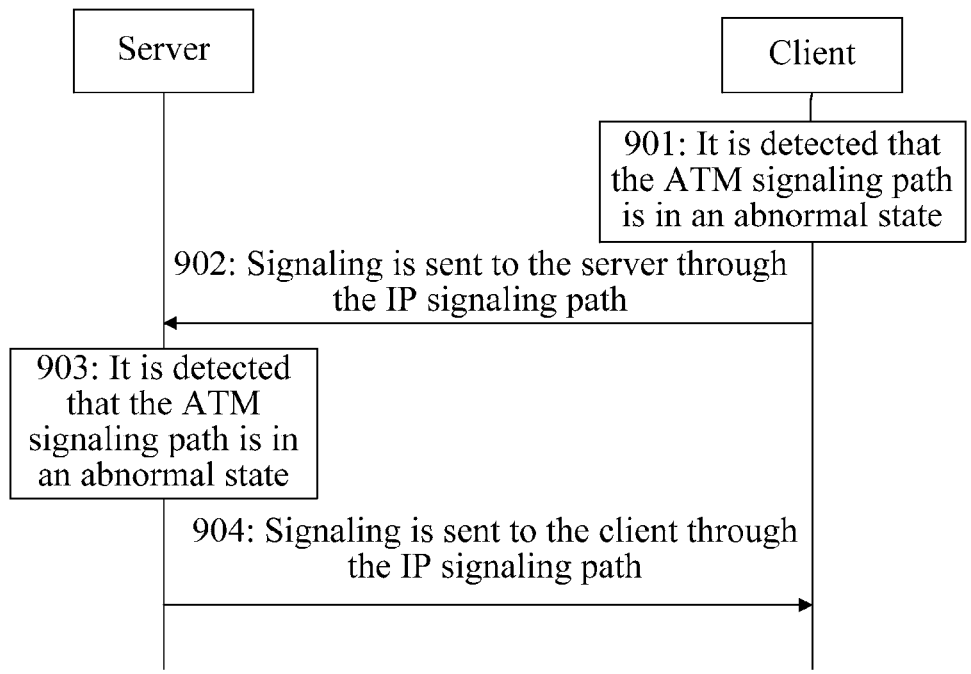
FIG. 9 is a flowchart of a second signaling path switching method in signaling transmission in Embodiment 3 of the present invention.

As shown in FIG. 9, the second possible process of signaling path switching protection between the client and the server includes the following steps.

901: The client detects that the ATM signaling path is in an abnormal state, and obtains the QoS of every IP signaling path.

902: The client sends signaling to the server through an IP signaling path of higher QoS.

903: The server detects that the ATM signaling path is in an abnormal state, and every IP signaling path is available.

904: The server switches over to an IP signaling path of higher QoS to send signaling to the client.

Figure 10:
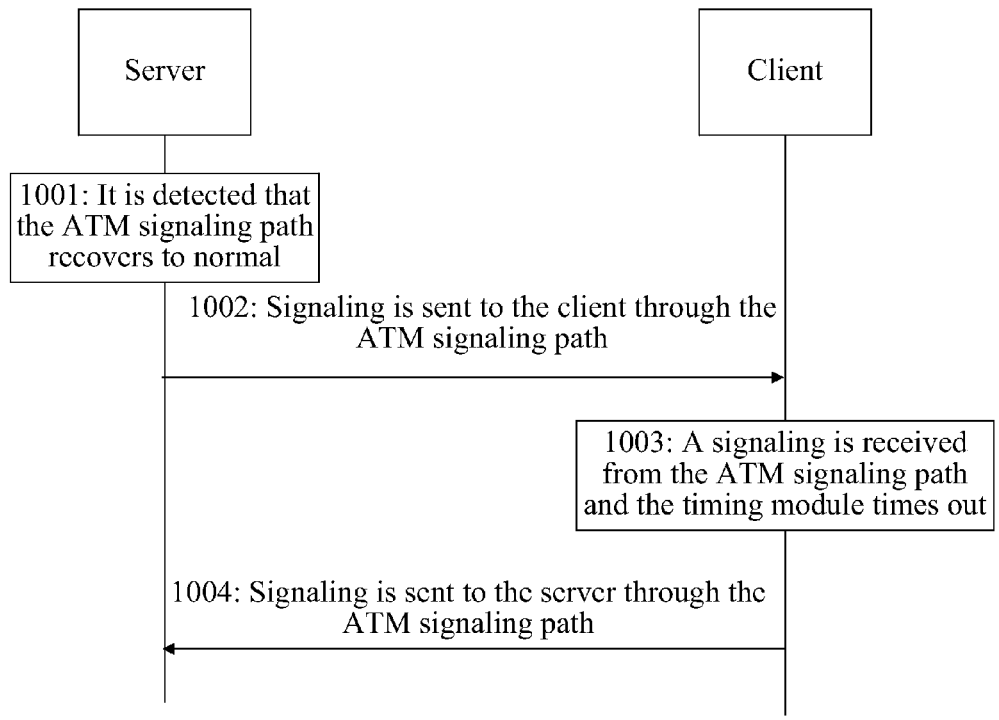
FIG. 10 is a flowchart of a third signaling path switching method in signaling transmission in Embodiment 3 of the present invention.

With respect to the third possible process, as shown in FIG. 10, the signaling transmission between the server and the client switches over to an IP signaling path. When the ATM signaling path recovers, the switchover steps are as follows.

1001: The server detects that the ATM signaling path recovers and the duration calculated by the timing module of the server exceeds the anti-switching time.

1002: The server sends signaling to the client through the ATM signaling path.

1003: The client obtains the signaling from the server on the foregoing ATM signaling path, and the duration calculated by the timing module of the client already exceeds the anti-switching time.

1004: The client switches over to the foregoing ATM signaling path to send signaling to the server.

In the foregoing signaling transmission system, a server is defined on one communication side, and a client is defined on another communication side. The operation of recovering the ATM signaling path is performed only on the server, and the abnormal state of the primary signaling path is judged only on the client according to a signaling received from the secondary signaling path. In this way, frequently switching between the client and the server may be prevented.

In this embodiment, the signaling path switches over to another signaling path only after the duration calculated by the timing module exceeds the anti-switching time, thus preventing frequent switching between signaling paths in a short time. Without such a timing module, the following scenario may occur.

Figure 11:
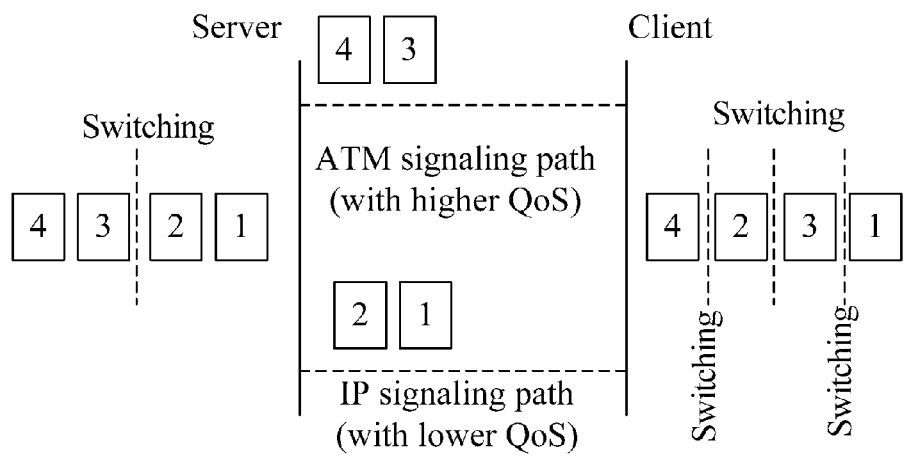
FIG. 11 shows signaling transmission in a signaling transmission system in Embodiment 3 of the present invention.

As shown in FIG. 11, the currently signaling path is an IP signaling path, the server sends packet 1 and packet 2 to the client through the IP signaling path. The ATM signaling path recovers, and the server switches over to the ATM signaling path so that the subsequent packet 3 and packet 4 are transmitted through the ATM signaling path. Because the IP signaling path involves a great delay, although packet 3 is sent later than packet 2, packet 3 arrives at the client earlier than packet 2. Therefore, the order of receiving the packets on the client are packet 1, packet 3, packet 2, and packet 4. Once the client receives packet 3 on the ATM signaling path, the client is triggered to switch over to the ATM signaling path, and then packet 2 is received on the IP signaling path, which triggers the client to switch over to the IP signaling path, and then packet 4 is received on the ATM signaling path, which triggers the client to switch over to the ATM signaling path again. The client switches over for three times by the time of receiving the signaling.

If a timing module is set on the client, when the duration calculated by the timing module does not exceed the unidirectional transmission delay of the IP signaling path, a signaling packet received from the ATM signaling path does not trigger the switchover from the IP signaling path to the ATM signaling path. Before timeout of the timing module, the client keeps processing all packets received through the secondary signaling path; when the duration calculated by the timing module exceeds the transmission delay of the IP signaling path, if the client still receives signaling sent by the server through the ATM signaling path, the client is triggered to switch over to the ATM signaling path.

If the detecting module detects the abnormal state not according to a signaling received from one of the secondary signaling paths, but according to an error of the currently primary signaling path, the client needs to switch over the signaling path immediately, and notify the timing module to recalculate duration.

The detection bases employed in this embodiment include proactive basis and reactive basis. Proactive basis means that the local terminal detects the need of switchover proactively and detects that switchover is required, and reactive basis means that the switchover of the peer is detected and the local needs to switch over accordingly, namely, if a valid signaling is received from one of the secondary signaling path and indicates that the peer has switched the primary path over to the secondary path, the local needs to switch over accordingly.

The detection modes based on a proactive basis include an alarm on the physical layer, BFD protocol, OAM protocol, link-layer status detection or link deletion, F4/F5 cell stream detection mechanism under ATM, or any combination thereof.

On a terminal, the foregoing detection modes do not all need to be supported. Several detection modes may be selected as required. In an embodiment of the present invention, existing physical-layer or link-layer detection mechanism or protocol may be selected flexibly to speed up the switchover between the primary signaling path and the secondary signaling path. The detection modes based on proactive bases are described below.

The physical-layer alarm is sensitive, and can detect the connected and disconnected state of the signaling path within 10 to 30 milliseconds. However, the physical-layer alarm detects only the physical-layer state of the device directly connected with the local device.

BFD is primarily designed to detect link quality of the Ethernet, and can detect the status of the path between a device and the adjacent layer-3 device within 100 milliseconds. By adjusting the detection time, the BFD can be used for end-to-end path status detection.

F4/F5 is primarily designed to detect the status of the ATM path, and can perform end-to-end detection and section-to-section detection. The Ethernet OAM protocol is similar to F4/F5 cell stream under ATM, and can perform end-to-end path status detection.

The link-layer status detection primarily refers to SAAL link status detection under ATM, and can perform end-to-end detection according to the POLL frame of SAAL. If the POLL frame fails to be received for three consecutive times, it is deemed that the link status is abnormal.

In this embodiment, the ATM signaling path and the IP signaling path are used as examples to describe the application of the present invention. In practice, signaling paths of other transmission modes may be created as required, and switchover can occur between the signaling paths of different transmission modes.

Although the foregoing embodiments of the present invention are switching protection methods put forward for signaling transmission, they are also applicable to data transmission only if an upper-layer application employed in the data transmission is modified properly. The primary modification is to cancel the binding between the upper-layer application and the link. In this way, the switchover between the paths of different transmission protocols does not affect the data operation performed by the upper-layer application.

The embodiments of the present invention are primarily applied to communication systems, and in particular, to the communication systems that support multiple transmission modes, for example, WCDMA system that supports IP bearers.

Persons of ordinary skill in the art should understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a ROM, a RAM, a magnetic disk, or a CD-ROM.

The above descriptions are merely preferred embodiments of the present invention, but not intended to limit the scope of the present invention. Any modifications, variations or replacement that can be easily derived by those skilled in the art should fall within the scope of the present invention. Therefore, the protection scope of the present invention is subject to the appended claims.

What is claimed is:

1. A signaling transmission protection method, comprising:
   creating a primary signaling path between a first apparatus and a second apparatus;
   creating at least one secondary signaling path between the first apparatus and the second apparatus, the secondary signaling path based on a transmission protocol different from a transmission protocol of the primary signaling path;
   sending signaling through the primary signaling path;
   detecting whether the primary signaling path is in an abnormal state; and
   switching over to one secondary signaling path of the at least one secondary signaling path to send the signaling if detecting that the primary signaling path is in the abnormal state, wherein, before switching over to one of the at least one secondary signaling path to send the signaling, the method further comprises:
   setting an anti-switching time of sending the signaling through the primary signaling path, wherein the anti-switching time is not less than maximum sensitivity of link detection or is not less than signaling transmission delay; and
   calculating a duration for sending the signaling through the primary signaling path,
   wherein switching over to the secondary signaling path to send the signaling if detecting that the primary signaling path is in the abnormal state further comprises switching over to the secondary signaling path to send the signaling if detecting that the primary signaling path is in the abnormal state and the duration for sending the signaling through the primary signaling path exceeds the set anti-switching time of sending the signaling through the primary signaling path.

2. The signaling transmission protection method of claim 1, further comprising receiving signaling from the primary signaling path and the at least one secondary signaling path that is created.

3. The signaling transmission protection method of claim 1, further comprising:
   detecting whether the primary signaling path recovers; and
   switching over to the primary signaling path to send the signaling if detecting that the primary signaling path recovers.

4. The signaling transmission protection method of claim 3, wherein, before switching over to the primary signaling path to send the signaling, the method further comprises:
   setting an anti-switching time of sending the signaling through the one of the at least one secondary signaling path, wherein the anti-switching time is not less than maximum sensitivity of link detection or is not less than signaling transmission delay; and
   calculating a duration for sending the signaling through the one of the at least one secondary signaling path;
   wherein the process of switching over to the primary signaling path to send the signaling if detecting that the primary signaling path recovers further comprises switching over to the primary signaling path to send the signaling if detecting that the primary signaling path recovers and the duration for sending the signaling through the one of the at least one secondary signaling path exceeds the set anti-switching time of sending the signaling through the one of the at least one secondary signaling path.

5. The signaling transmission protection method of claim 1, wherein the one secondary signaling path of the at least one secondary signaling path is the secondary path of the highest Quality of Service (QoS), and wherein, before switching over to the one secondary signaling path to send the signaling, the method further comprises obtaining the QoS of the at least one secondary signaling path that is created.

6. The signaling transmission protection method of claim 1, wherein the abnormal state of the primary signaling path is detected according to an alarm on a physical layer, a Bidirectional Forwarding Detection (BFD) protocol, an Operation Administration Maintenance (OAM) protocol, link-layer status detection, link deletion, or signaling received from the at least one secondary signaling path, or any combination thereof.

7. The signaling transmission protection method of claim 1, wherein the primary signaling path is an Asynchronous Transfer Mode (ATM) signaling path, and the at least one secondary signaling path is an Internet Protocol (IP) signaling path.

8. An apparatus, comprising:
a path creating module, configured to create a primary signaling path between first apparatus and second apparatus, and to create at least one secondary signaling path based on a transmission protocol different from a transmission protocol of the primary signaling path between the first apparatus and the second apparatus;
a detecting module, configured to detect whether the primary signaling path is in an abnormal state, and to trigger a signaling sending module to switch the primary path over to secondary path if detecting that the primary signaling path is in the abnormal state; and
the signaling sending module, configured to send signaling through the primary signaling path created by the path creating module and switch over to one of the at least one secondary signaling path to send the signaling after receiving from the detecting module a trigger for switchover from primary path to secondary path;
a timing module, configured to set an anti-switching time of sending the signaling through the primary signaling path and to calculate duration for sending the signaling through the primary signaling path; and
a judging module, configured to judge whether the duration for sending the signaling through the primary signaling path exceeds the anti-switching time of sending the signaling through the primary signaling path after the detecting module detects that the primary signaling path is in the abnormal state, and to trigger the signaling sending module to switch the primary signaling path over to secondary signaling path if the duration for sending the signaling through the primary signaling path exceeds the anti-switching time;
wherein the detecting module is further configured to detect whether the primary signaling path is in the abnormal state; and trigger the judging module if detecting that the primary signaling path is in the abnormal state; and
wherein the signaling sending module is further configured to switch over to one of the at least one secondary signaling path to send the signaling after receiving from the judging module a trigger for switchover from primary signaling path to secondary signaling path.

9. The apparatus of claim 8, further comprising a signaling receiving module, configured to receive signaling from the primary signaling path and the at least one secondary signaling path created by the path creating module.

10. The apparatus of claim 8, wherein
the detecting module is further configured to detect whether the primary signaling path recovers and to trigger the signaling sending module to switch secondary signaling path over to primary signaling path if detecting that the primary signaling path recovers; and
the signaling sending module is further configured to switch over to the primary signaling path to send the signaling after receiving from the detecting module a trigger for switchover from secondary signaling path to primary signaling path.

11. The apparatus of claim 8, wherein
the timing module is further configured to set anti-switching time of sending the signaling through the one of the at least one secondary signaling path and to calculate duration for sending the signaling through the one of the at least one secondary signaling path;
the judging module is further configured to judge whether the duration for sending the signaling through the one of the at least one secondary signaling path exceeds the anti-switching time of sending the signaling through the one of the at least one secondary signaling path after the detecting module detects that the primary signaling path recovers, and trigger the signaling sending module to switch from secondary signaling path over to primary signaling path if the duration for sending the signaling through the one of the at least one secondary signaling path exceeds the anti-switching time of sending the signaling through the one of the at least one secondary signaling path;
the detecting module is further configured to: detect whether the primary signaling path recovers; and trigger the judging module if detecting that the primary signaling path recovers; and
the signaling sending module is further configured to switch over to the primary signaling path to send the signaling after receiving from the judging module a trigger for switchover from secondary signaling path to primary signaling path.

12. The apparatus of claim 8, further comprising:
a Quality of Service (QoS) obtaining module, configured to obtain QoS of the at least one secondary signaling path created by the path creating module,
wherein the signaling sending module is further configured to switch over to the secondary signaling path of the highest QoS to send the signaling according to the QoS obtained by the QoS obtaining module.

* * * * *